A. ST. JOHN.

AIR BRAKE CONTROLLING APPARATUS.

APPLICATION FILED FEB. 2, 1920.

Reissued Dec. 27, 1921.

15,256

4 SHEETS—SHEET 1.

INVENTOR
ANCEL ST. JOHN
BY Wm. M. Cady
ATTORNEY

A. ST. JOHN.

AIR BRAKE CONTROLLING APPARATUS

APPLICATION FILED FEB. 2, 1920.

Reissued Dec. 27, 1921. 15,256.

4 SHEETS-SHEET 2.

INVENTOR

ANCEL ST. JOHN

BY Wm. M. Cady

ATTORNEY

A. ST. JOHN.

AIR BRAKE CONTROLLING APPARATUS.

APPLICATION FILED FEB. 2, 1920.

Reissued Dec. 27, 1921. 15,256.

4 SHEETS—SHEET 3.

INVENTOR
ANCEL ST. JOHN
BY Wm. M. Cady
ATTORNEY.

A. ST. JOHN.

AIR BRAKE CONTROLLING APPARATUS.

APPLICATION FILED FEB. 2, 1920.

Reissued Dec. 27, 1921. 15,256.

4 SHEETS—SHEET 4.

INVENTOR
ANCEL ST. JOHN
BY Wm. M. Cady
ATTORNEY

UNITED STATES PATENT OFFICE.

ANCEL ST. JOHN, OF CLEVELAND, OHIO, ASSIGNOR TO THE WESTINGHOUSE AIR BRAKE COMPANY, OF WILMERDING, PENNSYLVANIA, A CORPORATION OF PENNSYLVANIA.

AIR-BRAKE-CONTROLLING APPARATUS.

15,256. Specification of Reissued Letters Patent. Reissued Dec. 27, 1921.

Original No. 1,256,607, dated February 19, 1918, Serial No. 809,449, filed December 30, 1913. Application for reissue filed February 2, 1920. Serial No. 355,786.

*To all whom it may concern:*

Be it known that I, ANCEL ST. JOHN, a citizen of the United States, residing at Cleveland, in the county of Cuyahoga and State of Ohio, have invented new and useful Improvements in Air-Brake-Controlling Apparatus, of which the following is a specification.

This invention relates to an air brake controlling apparatus and particularly to a type of such apparatus adapted to be set in operation by track signals controlled by the usual block signal device.

It is an essential feature of such apparatus that the character of the brake application shall be duly coördinated with the existent conditions and accordingly it is one of the objects of my invention to provide a device which may be operated by a signal at intermediate or control position to reduce the speed of the train to a predetermined or control speed and which will be operated by a signal at stop position to cause an emergency application of the brakes and to bring the train to a stand still.

It is generally found desirable to permit a train to pass a control signal and even a stop signal without applying the brakes, provided the speed of the train does not exceed a maximum fixed in suitable relation to each condition. A second object of my invention is, therefore, to provide a device of the character described ordinarily operable by a track signal in either control or stop position but rendered automatically inoperable with respect to a signal in either position when the speed of the train does not exceed a maximum speed predetermined and fixed with reference to each position of the signal.

Another object is to remove the apparatus from the control of the engineer during the automatic operation of the device until the application of the brakes is completed and the speed reduced to a predetermined rate or until the train is brought to a standstill as conditions may require.

Another object of my invention is to provide an apparatus of the above character having means including a slide valve for imposing a plurality of fixed speed limits, and means controlled from the trackway for determining the position of the slide valve.

Another object is to provide a fluid pressure apparatus having three fixed conditions corresponding with three fixed speed limits, a speed responsive device on the vehicle coöperating with said apparatus to cause a brake application when the speed at any time exceeds the speed limit corresponding to the condition of the apparatus at such time, and trackway means for determining the condition of said fluid pressure apparatus.

Further objects of my invention will appear in the following description and will be specifically pointed out in the appended claims.

A preferred form of my invention is shown in the drawings in which—

Fig. 1 shows all parts of the automatic valve mechanism in normal running position;

Fig. 2 is a similar view showing certain of the parts in position to apply the brakes after being placed in operation by a track signal set in control position, this position of the parts being hereinafter referred to as service position;

Fig. 3 shows the parts in a further stage of the control application, this position being designated as the lap position in which the brakes are applied with constant pressure to reduce the speed of the train;

Fig. 4 shows the parts in position to release the brakes and to start the return of the parts to normal running position, this position being designated as release position;

Fig. 5 shows the parts during an emergency application of the brakes;

Fig. 6 shows the parts in the preliminary position for releasing the brakes after an emergency application;

Fig. 7 shows the parts in the final position for releasing the brakes after an emergency application;

Figure 8:
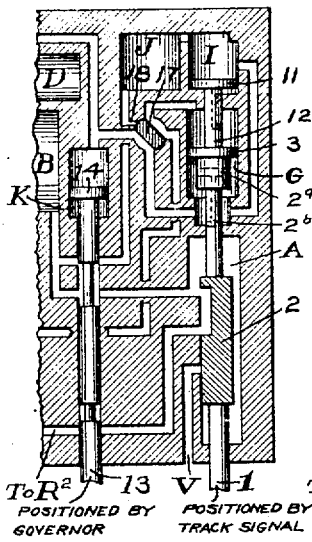
Figure 9:
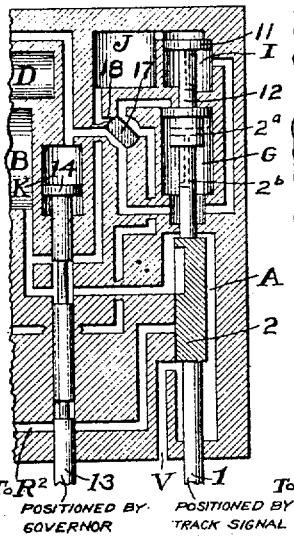
Figure 10:
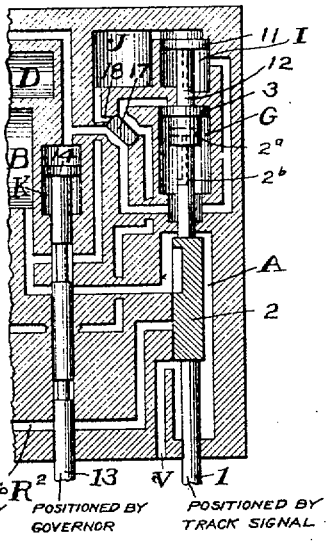

Fig. 8 shows the effect of the speed controlling mechanism during a control application of the brakes, and Figs. 9 and 10 show the effect of the speed controlling mechanism during an emergency application, the parts in Fig. 9 being in position to permit an emergency application after a train has passed a stop signal at a speed below the control speed but greater than the safe speed at which a train may pass a stop signal and Fig. 10 showing the speed regulating device in position to prevent an emergency application when the train is running at safe speed or less.

The automatic valve mechanism will first be described: All parts of this mechanism are shown diagrammatically in Fig. 1 whereas in Figs. 2 to 10 inclusive certain of the parts are omitted and only those parts are shown which are operable under the conditions shown in each figure. Connections which pass in the rear of other connections without intersecting them are conventionally shown as broken away on each side when passing the latter connections.

This portion of the apparatus consists essentially in the combination of a main valve moved by a piston traveling in cylinder, a plurality of reservoirs, and automatic valves for modifying in the proper order the connections between the cylinder and the reservoirs. The two portions of the cylinder and certain of the reservoirs normally contain air at main reservoir pressure, the main reservoir being a component part of the ordinary air brake mechanism.

When one portion of the cylinder is connected to a reservoir containing air at a lower pressure, the pressure in that portion of the cylinder will be reduced and the piston will move until the pressures are again equalized, the extent of its movement being determined by the original pressures and the dimensions of the various air containers. By the serial action of the automatic valves, the connections between the cylinder and the reservoirs are so modified that the main valve assumes the various positions necessary to apply and release the brakes in approximately the manner in which they are manually applied by the engineer.

Two types of brake application are provided for as follows: First, a control application which serves to reduce the speed of the train to a predetermined point when the train passes a track signal set at intermediate or caution position. Second, an emergency application which brings the train to a standstill when it passes a track signal set at danger or stop position.

The character of the application is determined by the position of the track signal, the operation of which is controlled by suitable connections to any of the ordinary types of block signal apparatus.

Figure 1:
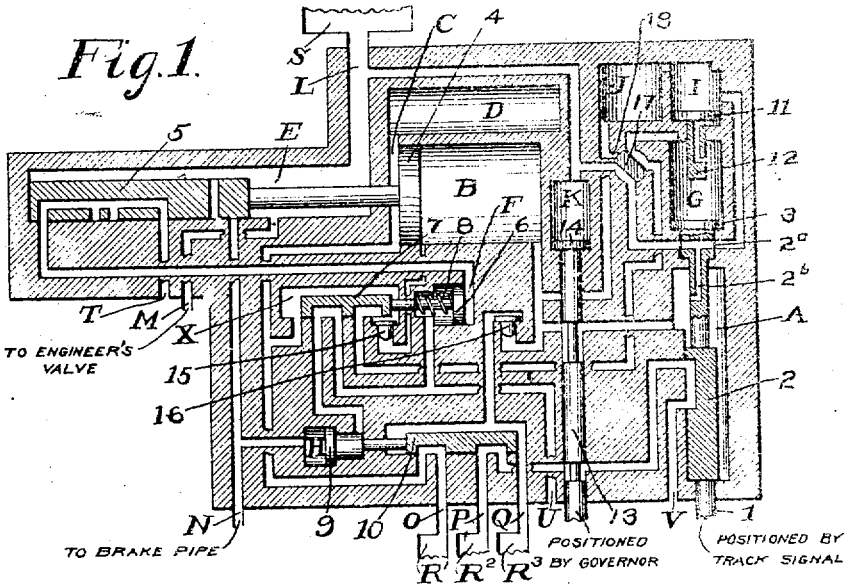
Figures 1 to 10 are diagrammatic views showing the automatic valve mechanism for applying the brakes or parts thereof in the several positions which they occupy during the different operations of the apparatus.

All parts of the automatic valve mechanism are for convenience represented diagrammatically as a single unit, but it should be understood that in practice the mechanism may consist of any desired number of separate parts suitably connected. As shown in Fig. 1, the automatic valve mechanism includes a starting plunger 1 adapted to be moved longitudinally by devices controlled by the track signals. Mounted upon the plunger 1 is a starting device 2 which serves when moved from its normal position to start the mechanism in operation for either a control or emergency application, the character of the application being determined by the position to which the starting valve is moved. Movement of the valve to the intermediate position shown in Fig. 2 results in a control application, while its movement to the extreme position shown in Fig. 5 results in an emergency application. The valve 2 is inclosed in an air chamber A. The starting plunger 1 has secured to its upper end a control piston 3 movable in an air chamber G. The upper end of the plunger is provided with a transverse passage $2^a$ and with a small longitudinal passage $2^b$ communicating therewith.

The main control piston is indicated at 4 and is connected by a plunger to the main valve 5. This valve in its various positions determines the connection of the brake pipe to the atmosphere or to the main reservoir, thereby resulting in the application or release of the brakes. The piston 4 moves in a cylinder of which the portion to the right of the piston is indicated by the reference letter B, while the portion to the left is indicated by the letter C. The chamber C communicates directly with a storage chamber D.

The valve 5 is mounted in an air chamber E which is directly connected by a pipe L to the main reservoir S. A piston 6 mounted in an air chamber F controls the movement of a slide valve 7, hereinafter designated as the charging valve, which is mounted in a chamber X and has for one of its functions the connection of the chamber C to the main reservoir when the parts are in normal position, thereby permitting the charging of the chamber C to main reservoir pressure. This admission of main reservoir pressure to the chamber C takes place through a system of connections including the emergency release valve 17, the small passages $2^a$ and $2^b$ in the upper part of the starting plunger 1, the valve chamber A, the passage from the chamber A past the governor plunger 13 to the chamber B, the small passage shown adjacent to the piston 4 in Fig. 1 and connecting the chamber B to the under-side of the check valve 15, the chamber X and the passage connecting said chamber to the chamber C. The piston 6 and the valve 7 are normally maintained in the position shown in Fig. 1 by a coil spring 8 encircling the piston rod.

An additional piston 9 is mounted in an air chamber H directly connected to the brake pipe N and serves to control the movements of a slide valve 10, hereinafter designated as the control valve, which serves to maintain the application of the brakes during a control application until the speed has been reduced to the permissible or control speed.

A piston 11 shown near the upper right hand corner of Fig. 1 is mounted to move in an air chamber I which is directly connected with an additional air space J. The piston 11 has secured thereto a plunger 12 which helps to prevent accidental displacement of the starting valve piston 3 and starting valve 2 during a control application of the brakes.

The plunger 12 is provided with a small air passage extending longitudinally thereof as indicated in Fig. 1 which serves to permit the escape of air from the lower portion of the chamber I, when the piston 11 moves to the position shown in that figure.

As previously stated it is one of the objects of my invention to render the automatic valve mechanism inoperative when the speed of the train is reduced below certain predetermined limits and the mechanism for attaining this result is indicated as a governor plunger 13 having two intermediate portions thereof cut away and provided at its upper end with a piston 14 movable in an air chamber K directly connected by one of the passages L to the main reservoir S.

The governor plunger is operated through suitable connections to any desired type of centrifugal governor but as the governor and connections form no part of my invention they are not shown in the drawings. For the understanding of this application, it is sufficient to state that the plunger is so connected that it will gradually rise as the speed is reduced reaching the position shown in Fig. 8 when the train is moving at control speed, and the position shown in Fig. 10 when the train moves at safe speed. The piston 14 moves to the extreme lower end of the chamber K when the train is moving at greater than control speed and to the extreme upper end when the train is brought to a standstill. Although shown as a plunger it should be understood that any suitable type of slide or piston valve may be substituted therefor.

Reference characters 15 and 16 indicate check valves in the connections leading from the chamber B. The emergency release valve 17 is shown in normal position in Fig. 1 and in position to start the release of the brakes after an emergency application in Fig. 6. The character 18 indicates a small passage to the chamber J which is normally closed by the valve 17.

As previously stated, the reference letter L indicates a connection to the main reservoir. M indicates a connection to the engineer's valve by which the brakes are ordinarily controlled. N indicates a connection to the brake pipe controlling the application of the brakes throughout the length of the train. O, P and Q indicate connections respectively to the air chambers $R^1$ $R^2$ and $R^3$, and T, U and V indicate exhaust ports leading from the valves 5, 7 and 2 respectively to the atmosphere.

The principal connections of the various chambers when the parts are in their normal running position are as follows; the starting valve chamber A is connected to the main reservoir S through the passage $2^b$ in the upper end of the starting plunger 1, the transverse passage $2^a$ therein, the emergency release valve 17 and the connection L. The main piston chamber B is connected to the starting valve chamber A through a passage controlled by the governor plunger 13. The chamber C is connected to the chamber B through the chamber X of the charging valve 7, around the end of said valve and through the check valve 15 and the small passage entering the chamber B near its left hand end. These connections insure main reservoir pressure in both the chamber B and the chambers C and D under normal conditions but any accidental movement of the piston 4 and valve 5 from the normal position immediately results in the closing of the passage to the check valve 15 and further movement of the piston is prevented as it is immediately resisted by the difference in pressure on the opposite sides of the piston.

The chamber D is always directly connected to the chamber C and serves merely for air storage. The main valve chamber E is directly connected to the main reservoir S through the connection L. The space F at the right side of the charging valve piston 6 is normally connected to the atmosphere through the main valve 5 and the brake pipe exhaust port T, while the space at the left side of the piston 6 is connected to the atmosphere through the charging valve exhaust port U.

The starting valve control cylinder G is normally connected to the chamber B through the emergency release valve 17, the charging valve 7 and the check valve 15. The control valve chamber H is directly connected upon the left side to the brake pipe N and upon the right side to the atmosphere through the charging valve 7 and the exhaust port U. The starting valve stop cylinder I is connected to the main reservoir through the transverse passage $2^a$ in the starting valve piston 1, the emergency release valve 17 and the connection L. The chamber J is always directly connected to the chamber I and serves for air storage purposes. The governor plunger chamber K is directly connected to the main reservoir.

The reservoir $R^1$ is normally connected to the chamber C through the connection O and the control valve 10. The reservoir $R^2$ is connected to the atmosphere through the connection P and the valve 10, the starting valve 2 and the starting valve exhaust port V. The reservoir $R^3$ is normally connected to the chamber B through the connection Q and the check valve 16.

It will thus be seen that in normal position all parts of the apparatus are maintained at main reservoir pressure except the chamber H which is at the pressure maintained in the brake pipe, usually somewhat less than that of the main reservoir, and the chamber F and reservoir $R^2$ which are open to the atmosphere.

The main features in the operation of the device will now be indicated with a detailed description of the movements of the several parts through which these results are obtained.

Figure 2:
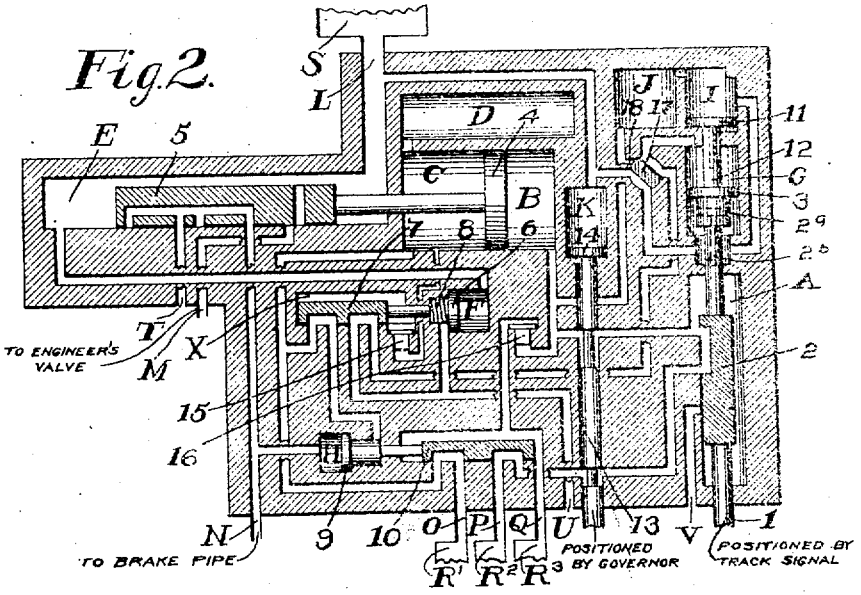

*Service position—Fig. 2.*

When the train passes a track signal set at the intermediate or control position the starting valve 2 will be moved to the intermediate position shown in Fig. 2. This movement of the valve causes the chamber B to be disconnected from the main reservoir S and to be connected to the reservoir $R^2$ which was formerly at atmospheric pressure, this connection being made through a recess in plunger 13, starting valve 2, a second recess in plunger 13, control valve 10 and connection P. This reduces the pressure in the chamber B causing the movement of the piston 4 to the right to the position shown in Fig. 2 and connecting the brake pipe N to the atmosphere through the exhaust port T. The pressure in the brake pipe is thus reduced and the brakes are thereby applied. The reservoir $R^3$ is closed by the check valve 16 as the pressure in chamber B falls and is therefore maintained at main reservoir pressure.

At the same time the engineer's valve connection M is cut off from the main reservoir preventing the release of the brakes by the engineer. Also a comparatively slight movement of the main valve is sufficient to permit air from chamber E at main reservoir pressure to pass around the end of the valve to the right side of chamber F shifting the charging valve piston 6 and valve 7 to the left. This connects chamber C to the right hand side of chamber H, and connects chamber G through the charging valve 7 and the exhaust port U to the atmosphere. The pressure in chamber G being thus reduced, the main reservoir pressure in chamber I holds the stop piston 11 securely seated and the pressure from below on the starting valve piston 3 forces it against the stop plunger 12 thus holding the starting valve in place in spite of jars and vibrations.

The pressure in the brake pipe is always maintained lower than in chamber C (except perhaps momentarily during the motion of the main valve and piston) but the left hand face of the control valve piston 9 is enough larger than the right hand face to compensate any difference in pressure that may exist and hold the valve closed until the brake pipe pressure is reduced to the proper point for effective application of the brakes. The piston 9 and the control valve 10 then move to the left to the position shown in Fig. 3.

Figure 3:
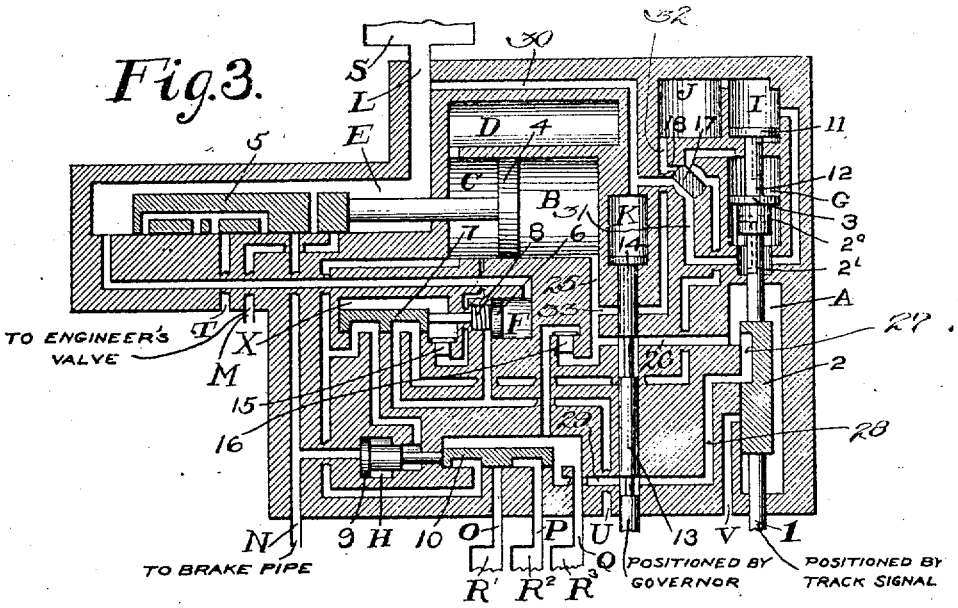

*Lap position—Fig. 3.*

As the control valve 10 moves to the left it cuts off the reservoir $R^1$ from the chamber C and the reservoir $R^2$ from the chamber B and connects the chamber B to reservoir $R^3$ through passage 25, past the governor plunger 13 to the passage 26, through cavity 27 in slide valve 2 to passage 28, past the governor plunger 13 to passage 29, which is uncovered by movement of the slide valve 10 to the left, and thence through the valve chamber containing the slide valve 10 to the passage Q and reservoir $R^3$. As this last reservoir was formerly closed at high pressure, its connection to the chamber B will increase the pressure in said chamber and cause the piston 4 to move a certain distance to the left so that the valve 5 will cut off the connections from the brake pipe N to the atmosphere. The pressure in the brake pipe is thereafter maintained constant and the application of the brakes will continue under this pressure until the speed has dropped to the predetermined point designated as the control speed.

Figure 4:
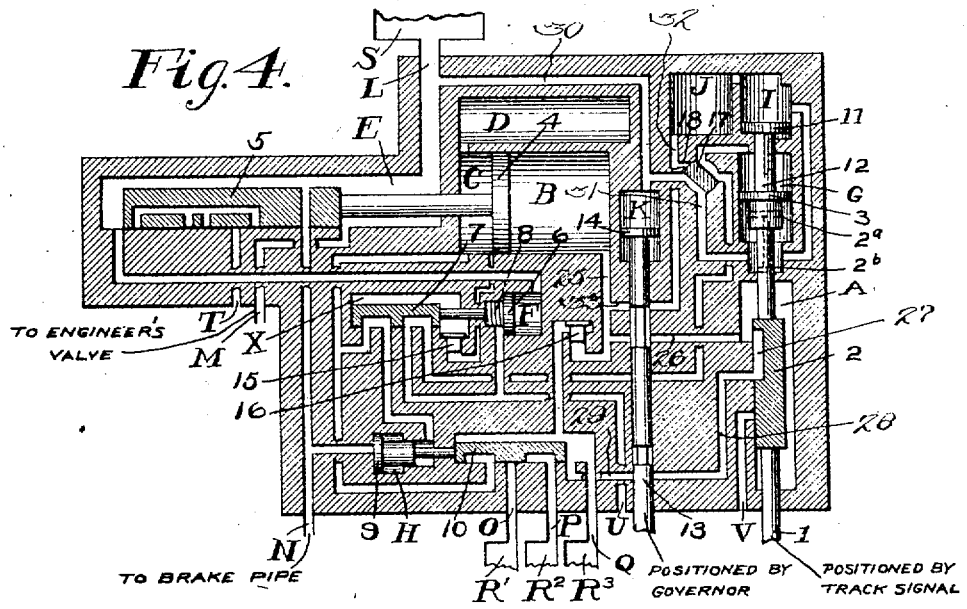

*Release position—Fig. 4.*

When this speed is reached, the governor plunger 13 rises to the position shown in Fig. 4 cutting off the prior connection from the chamber B to the reservoir $R^3$ and again connecting said chamber to the main reservoir S through passage L, passage 30, past the valve 17 to passage 31, through chamber I and then through chamber J to passage 32 and thence past the governor plunger 13 to passage 33 which opens into passage 25, leading to the chamber B. The reservoir $R^3$ is still connected to the chamber B through the check valve 16 permitting the pressure in $R^3$ to be restored to main reservoir pressure.

The resulting increase of pressure in the chamber B causes a still further movement of the piston 4 and valve 5 to the left thereby connecting the brake pipe N to the reservoir S which raises the pressure in the brake pipe and releases the brakes. This movement of valve 5 also restores the connection between the engineer's valve pipe M and the main reservoir. As the pressure in the brake pipe rises the valve 10 is forced to the right and connects the reservoir $R^1$ to the chamber C (Fig. 1). As the reservoir $R^1$ was cut off at less than main reservoir pressure the connection of the chamber C to the reservoir $R^1$ reduces the pressure in the chamber C and the piston 4 and valve 5 again move to the left and thus return to normal position. This cuts off the main reservoir from the brake pipe N and connects the right hand portion of chamber F to the atmosphere through the brake pipe exhaust port T. The spring 3 then shifts the charging valve 7 to the right reëstablishing the original connections of chambers C, G and H. The pressure on the upper and lower faces of the starting valve control piston 3 now being the same, (main reservoir pressure), the force on the upper face exceeds that on the lower owing to the area occupied by the starting plunger 1. Hence the starting valve control piston 3 and valve 2 will be returned to their normal positions. The governor plunger 13 will return to its normal position when the speed is sufficiently increased. The parts will then be again as shown in Fig. 1.

Figure 5:
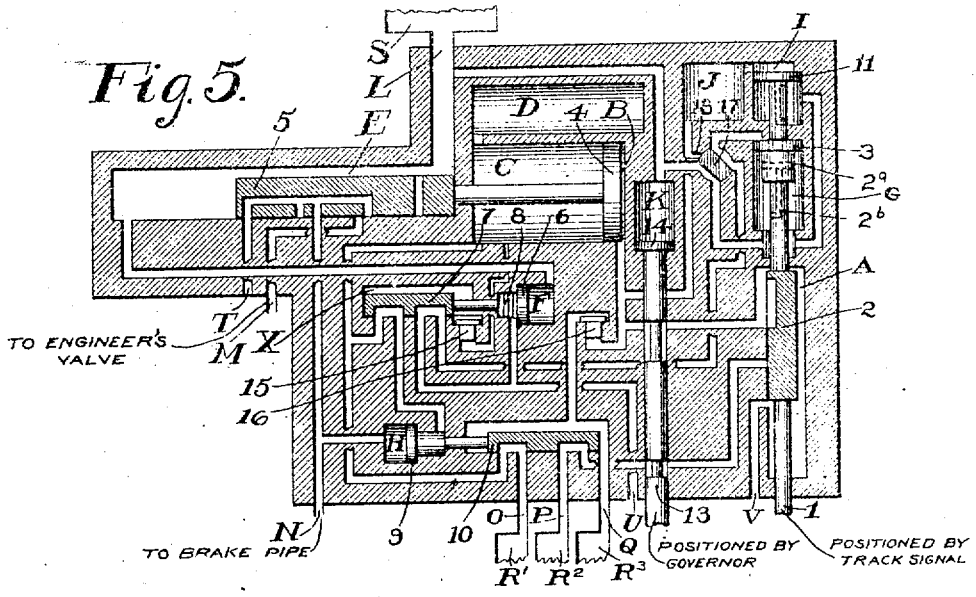

*Emergency application—Fig. 5.*

Referring now to the operation of the parts during an emergency application, it should be understood that if the starting plunger 1 is actuated by a track signal set in the stop or danger position, the starting valve will be moved to its extreme upper position. This movement results in directly connecting the chamber B to the atmosphere, through the starting valve chamber A and the exhaust port V. The main valve piston 4 and valve 5 are at once shifted as far as possible to the right connecting the brake pipe N to the atmosphere through the exhaust port T, cutting off the engineer's valve and admitting air from the main reservoir to the right hand side of chamber F through connection L and chamber E. The charging valve piston 6 and valve 7 are thus shifted to the left as in a control application connecting chamber C to the right hand side of chamber H and connecting chamber G to the atmosphere through the exhaust port U. The shifting of the starting valve control piston 3 to the extreme position has carried with it the stop piston 11. The chambers I and J are at main reservoir pressure before the raising of the stop piston 11 and this pressure is slightly increased by compression after the piston 11 cuts off the connection of the chamber I to the main reservoir S. The application of main reservoir pressure to the underside of both the stop piston 11 and the starting valve piston 3, the latter acting against atmospheric pressure only, is more than sufficient to overcome the downward pressure from the piston 11, thus holding both pistons securely in their extreme upper positions regardless of jolts or vibrations. All parts will maintain these relative positions until released as described below, except the governor plunger 13 which will gradually shift to its highest position as the speed is reduced, and control valve 10 which will eventually shift to the left.

Figure 6:
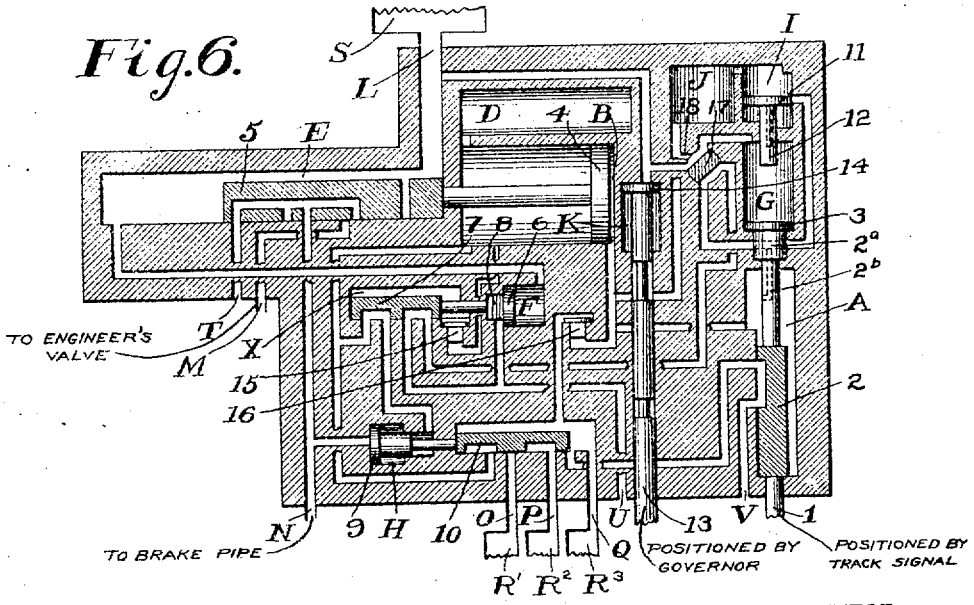

*Release after emergency application:—Preliminary position. Fig. 6.*

After the train has been brought to a full stop the brakes may be released by the manipulation of the emergency release valve 17. This is first rotated a quarter turn to the right from the position shown in Figs. 1–5 to that in Fig. 6. The main reservoir S is thus connected to chamber G and through the small passage 18 to chambers J and I. The space below the starting valve piston 3 and the space below the stop piston 11 are at the same time connected through the charging valve 7 and the exhaust port U to the atmosphere. The starting valve piston 3 is thus forced down returning the starting valve 2 to its normal position. The stop piston 11 is forced down till it clears the connection in the side of the chamber I when the pressure in the chambers I and J is relieved by the escape of air to the atmosphere. This gives an audible signal that this portion of the release has been completed.

Figure 7:
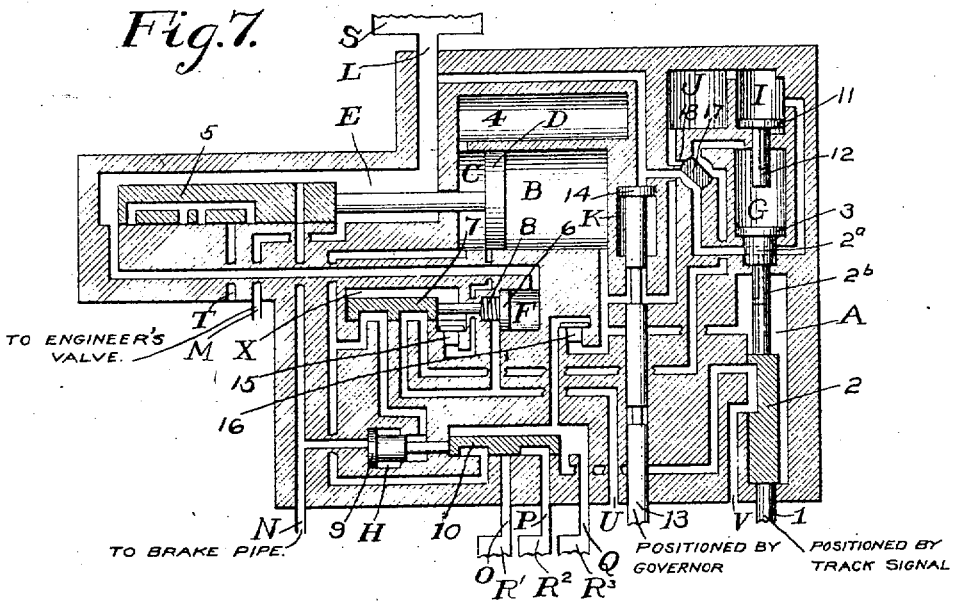

*Release after emergency application:—Final Position. Fig. 7.*

The emergency release valve 17 is then turned back to its original position admitting air from the main reservoir to chamber B through transverse passage $2^a$ chambers I and J and past the governor plunger 13. The main valve piston 4 and valve 5 are thus returned to approximately the same position as in a release after control application. The brakes are then released and the parts returned to their normal position as described in connection with the control application.

*Provision for rendering the valve mechanism inoperative at reduced speeds.*

The provision for disconnecting the brakes from the control of the starting valve when the speed is reduced to either control or safe speed is shown in Figs. 8, 9 and 10. In Fig. 8, the starting valve is in the position to which it has been moved by a track signal set in control position and it will be seen that as the train is moving within the control speed the governor plunger has risen to a position in which it cuts off the connection from the chamber B through the starting valve chamber A to the reservoir $R^2$ so that movement of the valve 2 does not reduce the pressure in the chamber B and is therefore ineffective to cause any movement of the piston 4 and valve 5. If, however, the starting valve 2 is moved to its extreme position as shown in Fig. 9 while the train is running at control speed the chamber B will be connected through the chambe A and the exhaust port V to the atmosphere and an emergency application of the brakes will follow.

In Fig. 10 the starting valve has also been moved to extreme position by a stop signal but as the speed of the train is not greater than the safe speed at which it is permitted to pass a stop signal the plunger 13 has risen still farther and cuts off the connection B from both the reservoir $R^2$ and the chamber A so that the pressure of the chamber B cannot be reduced and no application of the brakes will follow.

From the foregoing description it will be noted that the slide valve 2 has different positions for imposing a plurality of fixed speed limits and that the position of the slide valve is determined in accordance with the position of the signal control member 1 which is adapted to be moved longitudinally by a device controlled by the track signals.

The apparatus is also capable of assuming three fixed conditions corresponding with three fixed speed limits, as illustrated in Figs. 8, 9, and 10 of the drawings.

Having thus described my invention it will be evident that many changes and modifications can be made in each of the several parts thereof without departing from the spirit and scope of my invention and I do not wish to be limited to the specific details and arrangements herein described but what I do claim is:—

1. An air brake controlling apparatus comprising a main reservoir, a brake pipe, a main valve effective in different positions to close said brake pipe or to connect the same to the main reservoir or to the atmosphere, a piston to move said valve, a chamber on each side of the piston, a plurality of auxiliary reservoirs, and means to successively change the connections from said reservoirs to said chambers to vary the relative pressures upon the opposite sides of said piston and cause the piston and valve to assume the necessary positions to apply the brakes.

2. An air brake controlling apparatus comprising a main reservoir, a brake pipe, a main valve effective in different positions to close said brake pipe or to connect the same to the main reservoir or to the atmosphere, a piston to move said valve, a chamber on each side of the piston, a plurality of auxiliary reservoirs, and means to successively change the connections from said reservoirs to said chambers to vary the relative pressures upon the opposite sides of said piston and cause the piston and valve to assume the necessary positions to apply the brakes and speed control mechanism effective to release the brakes when the speed of the train has been reduced to a predetermined point.

3. An air brake controlling apparatus comprising a main reservoir, a brake pipe, a main valve effective in different positions to close said brake pipe or to connect the same to the main reservoir or to the atmosphere, a piston to move said valve, a chamber on each side of the piston maintained normally at a high pressure, an auxiliary reservoir maintained normally at a lower pressure, and means to connect one of said chambers to said auxiliary reservoir, the expansion of the air from said chamber to said reservoir reducing the pressure upon one side of said piston and causing the piston to move the main valve to apply the brakes.

4. An air brake controlling apparatus comprising a main reservoir, a brake pipe, a main valve effective in different positions to connect the brake pipe to the atmosphere, to close the brake pipe, and to thereafter connect said pipe to the main reservoir, and means including a track signal operated member and a speed controlled device effective to move said valve automatically to its different operative positions in the order named, said valve being maintained in position to close said brake pipe until the speed is reduced to a predetermined rate, and movement of said valve to thereafter connect said brake pipe to the main reservoir being governed by said speed controlled device.

5. An air brake controlling apparatus comprising a main reservoir, a brake pipe, a main valve effective in different positions to close said brake pipe or to connect the same to the main reservoir or to the atmosphere, means effective to move said valve to connect the brake pipe to the atmosphere, and to thereafter close said brake pipe at reduced pressure, speed controlled devices effective to thereafter connect the brake pipe to the main reservoir, and means to again close the brake pipe when the original pressure in the pipe has been restored.

6. An air brake controlling apparatus comprising a main reservoir, a brake pipe, a main valve effective in different positions to close said brake pipe or to connect the same to the main reservoir or to the atmosphere, and automatic means to move said valve to reduce the pressure in the brake pipe to a predetermined pressure greater than atmospheric and to thereafter move said valve to maintain the reduced pressure in said pipe, together with speed controlled means to release the brakes by restoring the original pressure in said pipe when the speed of the train is reduced to a predetermined point.

7. An air brake controlling apparatus comprising a main reservoir, a brake pipe, a main valve effective in different positions to close said brake pipe or to connect the same to the main reservoir or to the atmosphere, and automatic means to move said valve in one direction to apply the brakes and in the opposite direction in a series of steps to maintain the brakes in action until the speed is reduced to a predetermined point, and to thereafter release the brakes by restoring the original pressure in the brake pipe.

8. An air brake controlling apparatus comprising a main reservoir, a brake pipe, a main valve effective in different positions to close said brake pipe and to connect the same to the main reservoir or to the atmosphere, control mechanism comprising a signal operated member, a starting valve movable thereby, and connections from said starting valve to said main valve whereby said starting valve when moved to intermediate position is effective to move the main valve and apply the brakes to reduce the speed of a train to a predetermined or control speed, and whereby said starting valve when moved to extreme position is effective to move the main valve and apply the brakes to stop the train, and a speed controlled device effective to render said control mechanism inoperative when the starting valve is moved to intermediate position if the speed of the train does not exceed a fixed limit, but leaving the control mechanism operative when the starting valve is moved to extreme position although the train is moving at less than said fixed speed.

9. An air brake controlling apparatus comprising a main reservoir, a brake pipe, a main valve effective in different positions to close said brake pipe or to connect the same to the main reservoir or to the atmosphere, and automatic means effective under predetermined conditions to move the valve and apply the brakes to reduce the speed of the train to a predetermined or control speed, said means being also effective under different conditions to move the valve and apply the brakes to stop the train, and a speed controlled device to render said automatic means inoperative under said predetermined conditions when the speed of the train does not exceed the control speed but leaving said means operable under said different conditions at less than the control speed, said speed controlled device being also effective to render said automatic means inoperative under all conditions when the speed of the train does not exceed a lower predetermined or safe speed.

10. An air brake controlling apparatus comprising a main reservoir, a brake pipe, a main valve effective in different positions to close said brake pipe or to connect the same to the main reservoir or to the atmosphere, automatic means including a starting valve effective under predetermined conditions to bring the train to a stand-still, and a manually operated release valve to restore said starting valve to initial position, said automatic means thereafter operating to release the brakes and restore all parts of the apparatus to normal position.

11. An air brake controlling apparatus comprising a main reservoir, a brake pipe, a main valve effective in different positions to close said brake pipe and to connect the same to the main reservoir or to the atmosphere, means including a starting valve movable from normal position to two different operative positions and a speed controlled device, said means being effective when said starting valve is moved to one operative position to move said main valve into position to apply the brakes and stop the train, and said means being effective when said starting valve is moved to its second operative position to first move said main valve into position to apply the brakes and to thereafter move said main valve into position to release said brakes when the speed has been reduced to a predetermined rate, mechanical means to move said starting valve to either of said operative positions, and pneumatic means to hold said valve in such position.

12. An air brake controlling apparatus comprising brake operating devices, a starting valve, means to move said starting valve from inoperative position to either intermediate or extreme operative positions, pneumatic connections from said valve to said brake operating devices through which said valve is effective to apply the brakes and stop the train when moved to extreme position, and also to apply the brakes until the speed is reduced to a predetermined rate when moved to intermediate position, and a speed controlled device governing said latter application of the brakes.

13. An air brake controlling apparatus comprising a main reservoir, a brake pipe, a main valve effective in different positions to close said brake pipe or to connect the same to the main reservoir or to the atmosphere, a piston to move said valve, a chamber on each side of said piston maintained normally at high pressure, an auxiliary reservoir maintained normally at a lower pressure and automatic means to connect one of said chambers to said auxiliary reservoir, the expansion of air from said chamber to said reservoir reducing the pressure upon one side of said piston and causing the said piston to move till the pressures on opposite sides of said piston are equalized, the travel of the piston moving the main valve to apply the brakes.

14. An air brake controlling apparatus comprising a main reservoir, a brake pipe, a main valve effective in different positions to close said brake pipe or to connect the same to the main reservoir or to the atmosphere, a piston to move said valve, a chamber on each side of said piston maintained normally at high pressure, a plurality of auxiliary reservoirs maintained at relatively high and low pressures respectively, automatic means to connect a low pressure reservoir to one of said chambers, the resultant movement of the piston to equalize the pressures in the two chambers moving the main valve to apply the brakes, and automatic means to thereafter connect said chamber to a high pressure reservoir, the resultant movement of the piston being effective to release the brakes.

15. In a train speed control apparatus, the combination with fluid pressure operated mechanism capable of assuming a plurality of different positions for determining corresponding speed limits of the train, of a valve device having corresponding successive positions and operated from the trackway for controlling the fluid pressure on said mechanism.

16. In a train speed control apparatus, the combination with fluid pressure operated mechanism capable of assuming different positions for fixing corresponding different speed limits of the train, of a valve having positions corresponding with the positions of said mechanism for controlling the fluid pressure on and thereby the operation of said mechanism and a member associated with said valve and operated from the trackway for actuating said valve.

17. In combination, fluid pressure apparatus capable of assuming three fixed positions for determining three corresponding fixed speed limits of a train, a speed responsive device on the vehicle coöperating with said apparatus to cause a brake application when the speed at any time exceeds the speed limit corresponding to the position of said apparatus at such time, and a signal operated member controlled from the trackway for determining the position of said fluid pressure apparatus.

In testimony whereof I have hereunto set my hand.

ANCEL ST. JOHN.